(12) United States Patent
Ide

(10) Patent No.: US 7,103,252 B2
(45) Date of Patent: Sep. 5, 2006

(54) OPTICAL WAVEGUIDE AND FABRICATING METHOD THEREOF

(75) Inventor: Satoshi Ide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 10/103,752

(22) Filed: Mar. 25, 2002

(65) Prior Publication Data

US 2003/0081922 A1  May 1, 2003

(30) Foreign Application Priority Data

Oct. 25, 2001 (JP) .............................. 2001-328322

(51) Int. Cl.
*G02B 6/10* (2006.01)
*G02B 6/26* (2006.01)

(52) U.S. Cl. ........................................ 385/131; 385/42

(58) Field of Classification Search .................. 385/14, 385/15, 39, 42, 43, 129, 130, 131, 132, 50
See application file for complete search history.

(56) References Cited

U.S. PATENT DOCUMENTS

| | | | | |
|---|---|---|---|---|
| 3,785,717 A | * | 1/1974 | Croset et al. ............... | 385/132 |
| 4,274,854 A | * | 6/1981 | Pleibel et al. ............... | 65/403 |
| 4,673,270 A | * | 6/1987 | Gordon ....................... | 385/42 |
| 4,679,894 A | * | 7/1987 | Pavlath ....................... | 385/41 |
| 4,787,689 A | * | 11/1988 | Korotky et al. ............. | 385/130 |
| 4,796,968 A | * | 1/1989 | Coccoli et al. .............. | 385/42 |
| 4,932,740 A | * | 6/1990 | Berkey et al. ............... | 385/43 |
| 4,970,713 A | * | 11/1990 | Imoto .......................... | 385/15 |
| 5,647,040 A | * | 7/1997 | Modavis et al. ............. | 385/42 |
| 5,940,555 A | * | 8/1999 | Inaba et al. .................. | 385/14 |
| 6,134,361 A | * | 10/2000 | Urino ........................... | 385/42 |
| 6,389,203 B1 | * | 5/2002 | Jordan et al. ................ | 385/50 |
| 6,411,765 B1 | * | 6/2002 | Ono ............................. | 385/131 |
| 6,535,672 B1 | * | 3/2003 | Paiam ........................... | 385/42 |
| 6,542,687 B1 | * | 4/2003 | Won et al. .................... | 385/130 |
| 6,603,592 B1 | * | 8/2003 | Joyner et al. ................. | 359/332 |
| 6,724,968 B1 | * | 4/2004 | Lackritz et al. .............. | 385/131 |
| 2002/0044733 A1 | * | 4/2002 | Nakajima ..................... | 385/14 |
| 2002/0181868 A1 | * | 12/2002 | McGreer ...................... | 385/37 |

FOREIGN PATENT DOCUMENTS

| | | | |
|---|---|---|---|
| EP | 756184 A2 | * | 1/1997 |
| JP | 55093123 A | * | 7/1980 |

(Continued)

OTHER PUBLICATIONS

Translation of JP 06110091 A, Suzuki et al., Apr. 22, 1994.*

*Primary Examiner*—Edward J. Glick
*Assistant Examiner*—Chih-Cheng Glen Kao
(74) *Attorney, Agent, or Firm*—Staas & Halsey LLP

(57) ABSTRACT

An optical waveguide used in a WDM optical transmission system are fabricated by the following steps in order to be highly integrated and reduced in size and to have a more preferable design. Namely, a first cladding and a first core are formed on a substrate; at least the first core is etched so as to remain a first waveguiding part for guiding light and non-waveguiding parts, disposed on the both sides of the waveguiding part along a guiding direction of the guiding of light, for guiding no light and in such a manner that two grooves, having varying widths in the guiding direction respectively, are formed between the waveguiding part and each of the non-waveguiding parts; a second cladding is deposited on the remaining first core and the fist cladding; and the second cladding is reflowed by a heat treatment so as to be flattened.

15 Claims, 11 Drawing Sheets

FOREIGN PATENT DOCUMENTS

| | | | |
|---|---|---|---|
| JP | 01189614 A * | 7/1989 | |
| JP | 05173036 A * | 7/1993 | |
| JP | 06110091 A * | 4/1994 | |
| JP | 06-175172 | 6/1994 | |
| JP | 07056032 A * | 3/1995 | |
| JP | 2001-091775 | 4/2001 | |

* cited by examiner

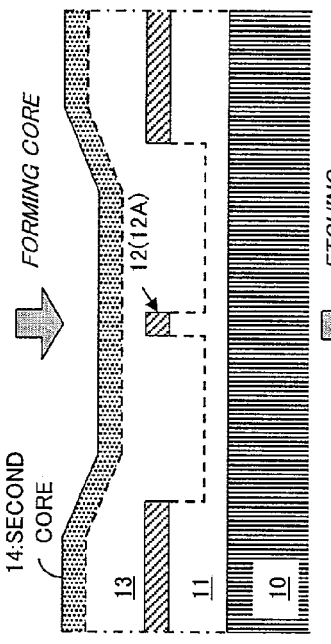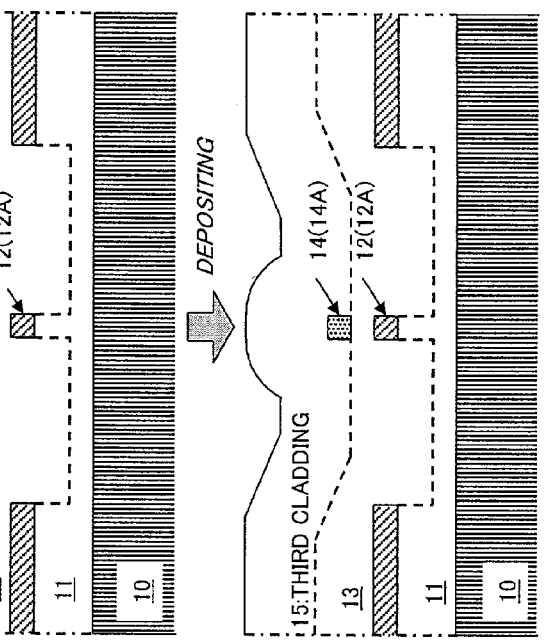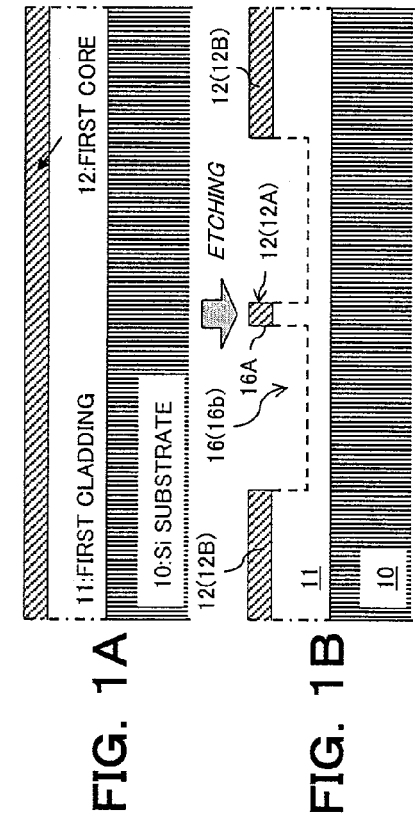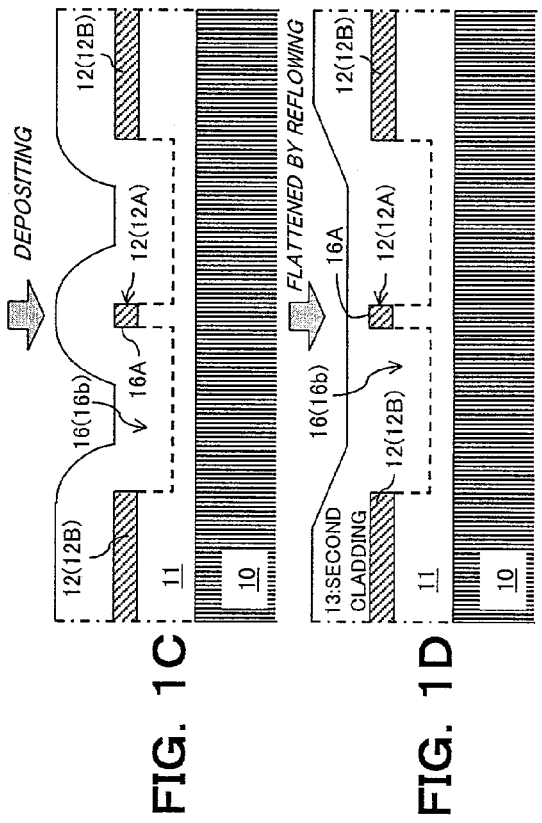

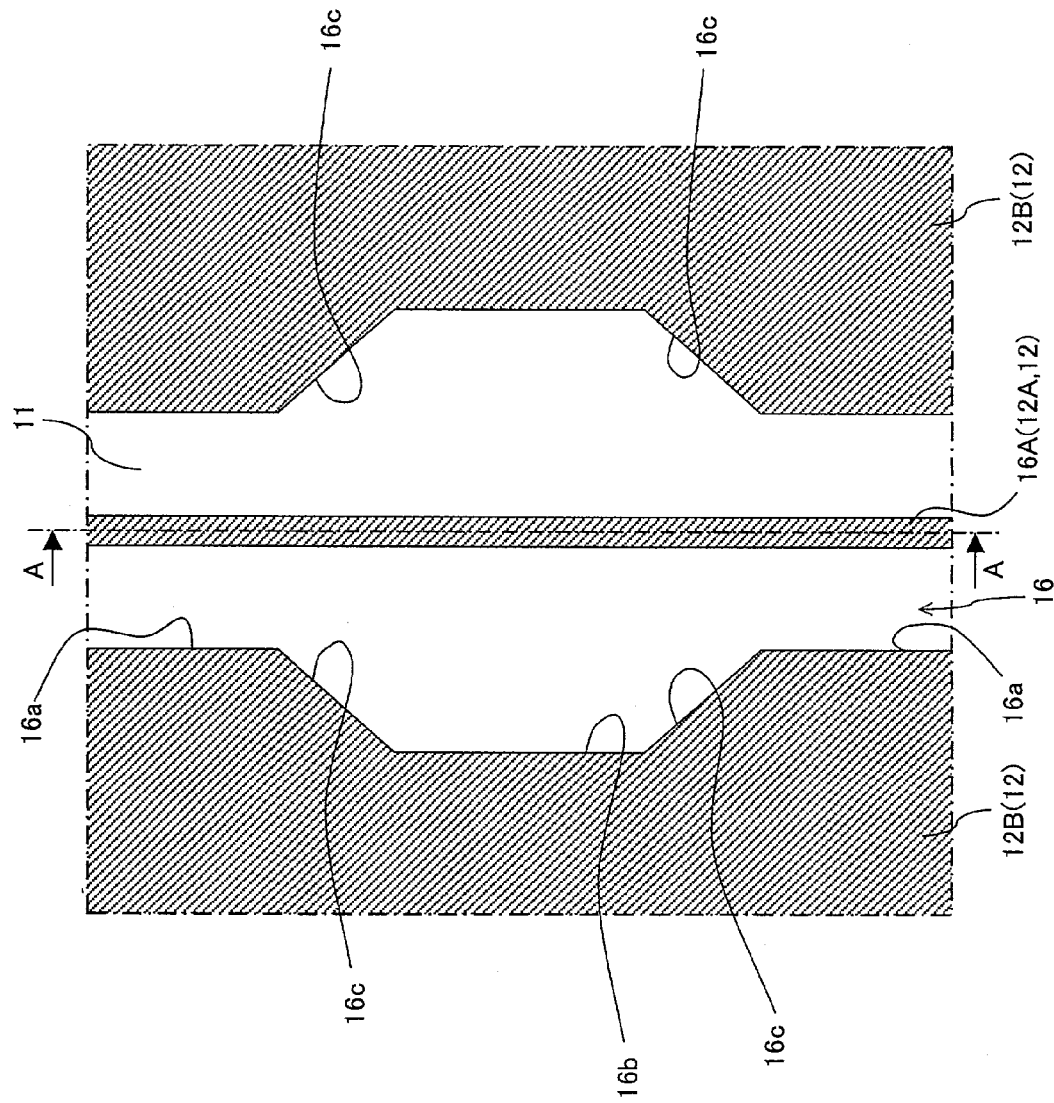

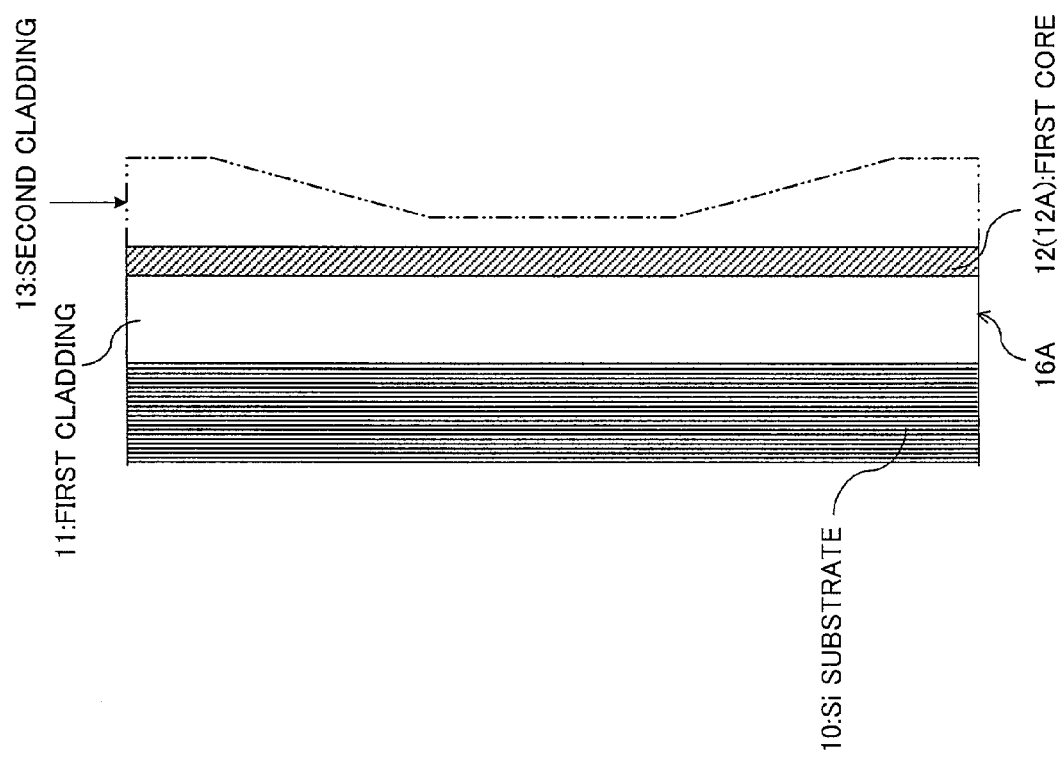

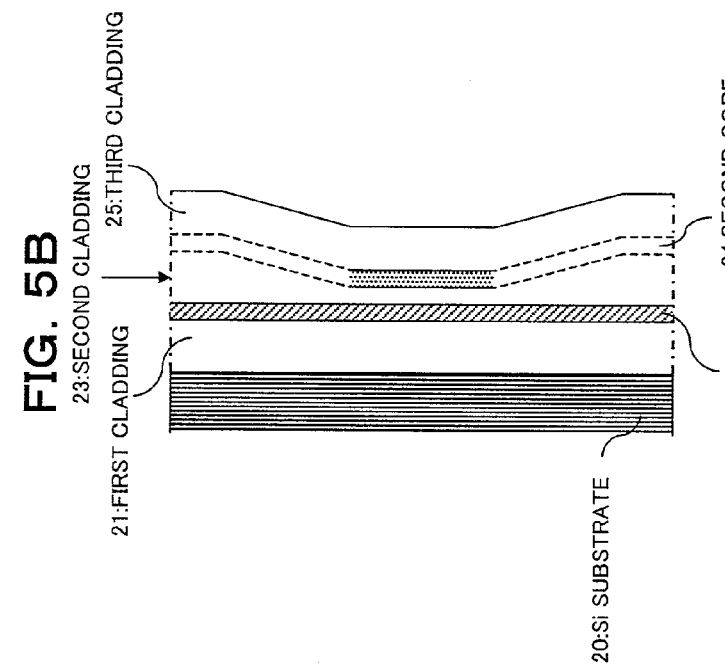
FIG. 5B
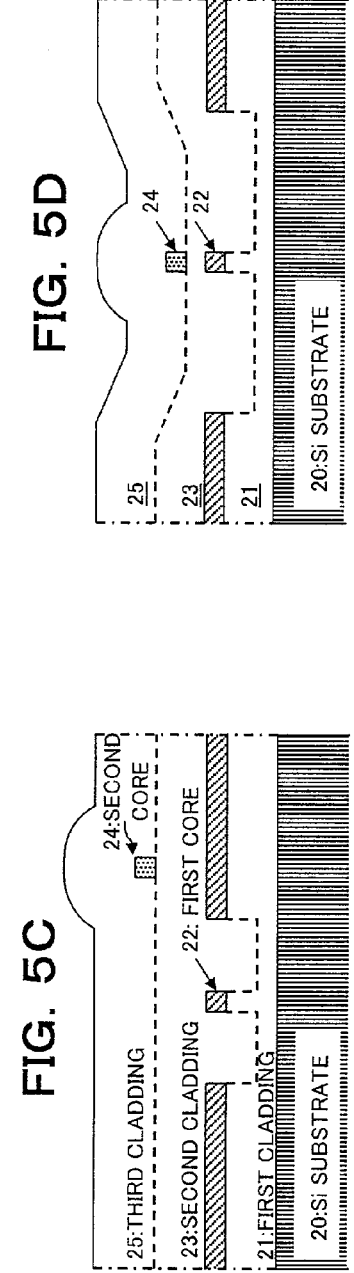
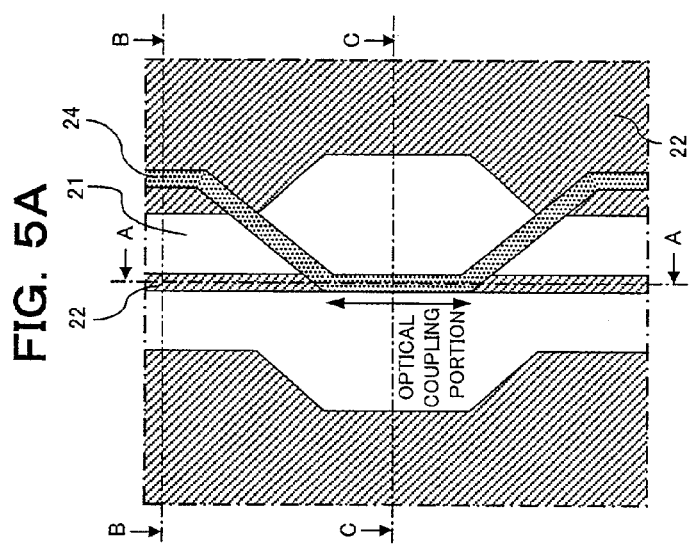
FIG. 5A

OPTICAL WAVEGUIDE AND FABRICATING METHOD THEREOF

BACKGROUND OF THE INVENTION

1. Field of the Invention

The present invention relates to an optical waveguide and a method for fabricating thereof, which waveguide preferably applies to an optical integrated circuit (an optic-electronic integrated circuit) on which various optical devices and elements are closely arranged used for wavelength division multiplexed (WDM) optical transmission system.

2. Description of the Related Art

With the significant increase in data traffic in accordance with a world-wide spread of Internet, people value a WDM optical transmission system more highly than ever for the purpose of realizing a photonic network operable to catch up with the significant increase in data traffic.

In order to realize such a WDM optical transmission system, not only various optical elements and devices but also one or more optical active devices (e.g., LD (laser diode), PD (photo diode)) and electronic devices or elements can be integrated by using PLC (Planer Lightwave Circuit) technology. Further, a PLC is in the form of a multi layer having two or more waveguides so as to be more integrated.

An optical device formed by an optical waveguide is exemplified by an optical directional coupler (divider/coupler) thereby serving as a waveguide-type optical directional coupler (divider/coupler).

A multi-layer PLC includes a first waveguide 110 formed by a first cladding 101, a first core 102 and a second cladding 103, and a second waveguide 111 formed by second cladding 103, a second core 104 and a third cladding 105, as shown in FIGS. 11A through 11C. First waveguide 110 and second waveguide 111 are on a Si substrate 100. First core 102 and second core 104, through which signal light is guided respectively as first and second waveguides 110 and 111, are arranged so as to come partially closer to each other (the closer part is called an optical coupling portion) so that signal light propagating respectively through first core 102 and second core 104 is coupled (or divided). For the convenience of the description, only first core 102 and second core 104 are marked respectively with bias lines and dots, as shown in FIGS. 11A through 11C.

First waveguide 110 is formed by embedding channel-shaped first core 102 with first cladding 101 and second cladding 103, which have lower refractive indexes than the first core 102, so that signal light to be propagated is enclosed in first core 102 and is guided through first core 102.

In the same manner, second waveguide 111 is formed by embedding channel-shaped second core 104 with second cladding 103 and third cladding 105, which have lower refractive indexes than the second core 104, so that signal light to be propagated is enclosed in second core 104 and is guided through second core 104.

For example, first core 102 and second core 104 are made from GPSG, which is silica glass in the form of particles doped with dopants of germanium (Ge) and phosphorus (P), and first through third claddings 101, 103 and 105 are made from BPSG, which is silica glass in the form of particles doped with dopants of boron (B) and phosphorus (P).

As shown in FIG. 11A, first core 102 is a straight line extending parallel to a guiding direction of the guiding light. Conversely, second core 104 formed on first cladding 101 with second cladding 103 interposed as shown in FIG. 11B is parallel to first core 102 in the guiding direction (in a direction of the thickness of the optical waveguide) and is bent (curved) in a horizontal-perpendicular direction (a direction perpendicular to the guiding direction on one and the same horizontal plane; a direction of the width of the optical waveguide) so that the combination of first core 102 and second core 104 performs an optical coupling, as shown in FIG. 11A.

A part of second core 104, of which another is arranged apart from first core 102 with respect to the horizontal direction of the plane, is arranged directly above first core 102 in such a manner that the length of the portion that first core 102 and second core 104 comes closer (the optical coupling portion) is optimized as a previous design directs. As a result, power of signal light propagating through first core 102 is distributed to first core 102 and second core 104 at a rate (a ratio, a coupling rate) in accordance with the length of the optical coupling portion of first core 102 and second core 104.

As another example of an optical part formed by an optical waveguide, a multimode interference optical coupler applies to a waveguide-type multimode interference (MMI) optical coupler (a multimode interference optical divider/coupler).

The above-mentioned conventional multi-layer waveguide with PLC has second core 104 that comes partially closer to first core 102 by bending (curving) second core 104 in the horizontal direction. The distance between first core 102 and second core 104 requires being close enough for optical coupling at the optical coupling portion that second core 104 comes directly above first core 102. In other words, the thickness of second cladding 103 formed between first core 102 and second core 104 is thin enough to allow an optical coupling.

Since the thickness of second cladding 103 formed between first core 102 and second core 104 is thin, there is a possibility of unexpected optical coupling thereby resulting in cross talk when second core 104 except the optical coupling portion is relatively close to first core 102 with respect to the horizontal direction. As a solution to eliminate cross talk, second core 104 except the optical coupling portion requires being arranged distant enough from first core 102 in the horizontal direction whereupon the arrangement of claddings and cores is restricted and the object (e.g., reducing the size, highly integrating) of the multi-layer optical waveguide would not be fully attained.

In a contrary fashion to a waveguide-type optical directional coupler, a waveguide-type MMI optical coupler requires a connecting section to connect two neighboring waveguides and the connecting section should be formed at a portion where the two waveguides come closer.

Therefore, the distance of the two waveguides formed to be narrower at the portion where the connecting section is formed and to be wider at the other portion. A conventional multi-layer waveguide-type MMI optical coupler has restriction with respect to the arrangement of claddings and cores as well as the above-mentioned conventional multi-layer waveguide-type optical directional coupler.

A waveguide-type optical device, such as a waveguide-type optical switch, a waveguide-type optical deflector, or a waveguide-type optical phase controller (modulator) by utilizing physical effect exemplified by electro-optic (EO) effect, magneto-optic (MO) effect, acousto-optic (AO) effect, and thermo-optic (TO) effect is fabricated.

For example, a waveguide-type optical phase controller utilizing TO effect includes a heater installed at an optical waveguide formed on a substrate and one or more electrodes connected to the heater. Supplying electricity to the heater through the electrodes varies the temperature of the optical waveguide thereby controlling the phase of signal light propagating through a waveguide of the optical waveguide.

At that time, avoiding a part of the optical waveguide which part is not desired to vary in temperature requires a part of the cladding to part which the heater is installed to be thinner.

As a result, since the distance between the heater and the core to guide light should be thin at the portion serving as a phase controller and should be thick at the remaining portion except the phase controller portion, the arrangement of claddings and cores is restricted as well as the above-mentioned multi-layer waveguide-type optical directional coupler.

SUMMARY OF THE INVENTION

With forgoing problems in view, it is a first object of the present invention to provide a highly-integrated (multi-layer) optical waveguide reduced in size, which is allowed to be designed in a more desirable way. It is a second object to provide a fabricating method for the optical waveguide of the first object.

To attain the first object, as a first generic feature, there is provided an optical waveguide formed on a substrate comprising: a core including a waveguiding part for guiding light and a non-waveguiding part for guiding no light; and a cladding, formed on the waveguiding part of the core, having a varying thickness in a guiding direction of the guiding of light.

Since the cladding can have an arbitrary thickness, it is possible to design the optical waveguide and a waveguide device having various optical devices added thereto to a more desirable configuration. An optical integrated circuit and an electronic integrated circuit having the optical waveguide of the present invention result in being highly integrated and reduced in size.

As a second generic feature, there is provided an optical waveguide (a multi-layer optical waveguide, a waveguide-type optical directional coupler) formed on a substrate comprising: a first core including a waveguiding part for guiding light and a non-waveguiding part for guiding no light; a cladding formed on the first core; and a second core, formed on the first core with the cladding interposed, for guiding light; the cladding having a varying thickness in a guiding direction of the guiding of light so that at least one part of the second core comes to closer to the first core.

Further, as a third generic feature, there is provided an optical waveguide (a multi-layer optical waveguide, a multimode interference optical coupler) formed on a substrate comprising: a first core including a waveguiding part for guiding light and a non-waveguiding part for guiding no light; a cladding formed on the first core, having a varying thickness in a guiding direction of the guiding of light thereby having a thinner part of which thickness is thinner than the other part; a second core, formed above the first core with the cladding interposed, for guiding light; and a connecting section, disposed at the thinner part at which the second core comes closer to the first core, for connecting the waveguiding part of the first core and the second core.

As a preferable feature, the optical waveguide (the multi-layer optical waveguide, the phase controller) may comprise an electronic circuit, which is exemplified by a heater and one or more electrodes, disposed at a portion of the cladding, the portion being thinner than the remaining portion of the cladding.

To attain the second object, as a fourth generic feature, there is provided a method for fabricating an optical waveguide, comprising the steps of: (a) forming a first core on a first cladding formed on a substrate; (b) etching at least the first core in such a manner that the remaining first core includes a first waveguiding part for guiding light and non-waveguiding parts, disposed on the both sides of the waveguiding part along a guiding direction of the guiding of light, for guiding no light and in such a manner that two grooves, having varying widths in the guiding direction respectively, are formed between the waveguiding part and each of the non-waveguiding parts; (c) depositing a second cladding on the remaining first core and the first cladding; and (d) reflowing the second cladding, which has been deposited in the second-cladding depositing step (c), by a heat treatment so as to flatten the second cladding.

Since the cladding can have an arbitrary thickness, it is possible to design the optical waveguide having various optical device and a waveguide device to a more desirable configuration. An optical integrated circuit and an electronic integrated circuit having the optical waveguide of the present invention result in being highly integrated and reduced in size.

As a fifth generic feature, a method for fabricating an optical waveguide, comprising the steps of: (a) forming a first cladding on a substrate and a first core on the first cladding; (b) etching at least the first core in such a manner that the remaining first core includes a first waveguiding part for guiding light and non-waveguiding parts, disposed on the both sides of the waveguiding part along a guiding direction of the guiding of light, for guiding no light and in such a manner that two grooves, having varying widths in the guiding direction respectively, are formed between the waveguiding part and each of the non-waveguiding parts; (c) depositing a second cladding on the remaining first core and the first cladding; (d) reflowing the second cladding, which has been deposited in the second-cladding depositing step (c), by a heat treatment so as to flatten the second cladding; (e) forming a second core on the second cladding, which has been flattened in the reflowing step (d);(f) etching the second core in such a manner at least portion of the remaining second core, which core is operable to guide light, is arranged directly above the first core; and (g) depositing a third cladding on the remaining second core, which is remaining after the second-core etching step (f).

Other objects and further features of the present invention will be apparent from the following detailed description when read in conjunction with the accompanying drawings.

BRIEF DESCRIPTION OF THE DRAWINGS

FIGS. 1A through 1G are sectional views overall illustrating successive steps of a method for fabricating of an optical waveguide according to a first embodiment of the present invention;

FIG. 2 is a top view showing a first core etched by the fabricating method of the first embodiment;

FIG. 3 is a sectional view showing a varying thickness of a second cladding of FIG. 2 sectioned by line A—A;

FIG. 5A is a top view showing a multi-layer waveguide-type optical directional coupler according to a first modification of that of FIG. 4A;

FIGS. 5B, 5C and 5D are sectional views respectively showing the multi-layer waveguide-type optical direction coupler of FIG. 5A sectioned by lines A—A, B—B, and C—C, respectively;

DESCRIPTION OF THE PREFERRED EMBODIMENTS

Figure 4B:
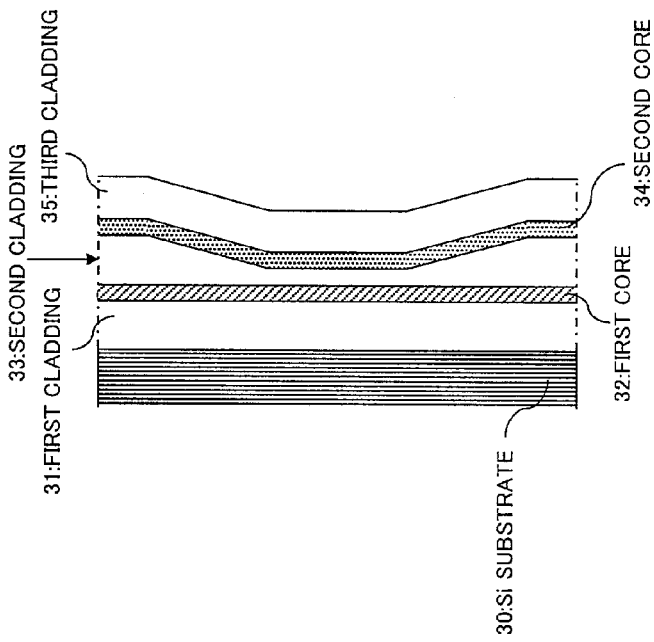
FIGS. 4B, 4C and 4D are sectional views respectively showing the multi-layer waveguide-type optical directional coupler of FIG. 4A sectioned by lines A—A, B—B, and C—C, respectively.

Various preferred embodiments of the present invention will be described with reference to the accompanying drawings.

The present invention relates to an optical waveguide applied to various elements or devices (optical communication circuit parts, WDM communication circuit parts) used in a WDM (Wavelength Division Multiplexed) optical transmission system. The present invention results in realizing a small-sized highly-integrated optical waveguide (further, an optical integrated circuit), having a multiple layers, with low costs by adjusting the thickness (membrane thickness) of a cladding.

A method for fabricating an optical waveguide according to a first embodiment will be described with reference to FIGS. 1A through 1G.

First of all as shown in FIG. 1A, boron-phosphosilicate glass (BPSG), of which basis is silicon dioxide ($SiO_2$) in the form of particles doped with dopants of boron (B) and phosphorus (P), is deposited on a silicon (Si) substrate 10 by, for example, a method of flame hydrolysis deposition (FHD), and further germano-phosphosilicate glass (GPSG), of which basis is silicon dioxide in the form of particles doped with dopants of germanium (Ge) and phosphorus (P) is deposited on the first BPSG layer by FHD. After that, the first BPSG and first GPSG layers are vitrified into transparent glass thereby forming a first cladding (lower cladding) 11 and first core 12 (a first-cladding/core forming step, a first-core forming step).

First cladding 11 and first core 12 formed on Si substrate 10 is etched into a channel shape (a U shape) by photolithography process and reactive ion etching (RIE) process so as to form a groove 16 having convex part 16A in the form of a thin strip projected as shown in FIG. 1B (a first-core/cladding etching step, a first-core etching step) Convex part 16A, which is a part of first core 12 that is remaining after the etching, is also referred as a waveguiding part 12A because of its function of guiding light as an optical waveguide, which is fabricated by the above-mentioned method.

In the illustrated example, the etching is performed not only on first core 12 but also on some portion of first cladding 11 thereby forming groove 16 deeper than that formed when only first core 12 is etched. As a result, it is possible for a later-described second cladding 13 that is to be formed on first core 12 to have a vastly varying thickness. Alternatively, the etching may be performed on only first core 12.

In the first embodiment, etching first core 12 (and first cladding 11) into channel shape makes first core 12 remain at the both outsides of groove 16 (along groove 16 in a guiding direction of guiding of light, on the both side of the optical waveguide) in addition to convex part 16A, disposed at the center line of the optical waveguide and extending along the guiding direction. A part of first core 12, which part is remaining on the both outsides of groove 16 after the first-core etching step (the first-core/cladding etching step), does not guide light and the remaining part of first core 12 except waveguiding part 12A is therefore called non-waveguiding part 12B to guide no light.

Specifically, groove 16 of the first embodiment has narrower portions 16a and wider portion 16b as shown in FIG. 2. For this shape of groove 16, second cladding 13 formed onto groove 16 has a varying thickness, i.e., second cladding 13 formed on wider portion 16b is thinner than that on each narrower portion 16a, as shown in FIG. 3 that is a sectional view of the optical waveguide of FIG. 2 sectioned by chain line A—A. Namely, second cladding 13 formed on a part of first core 12 which part serves as waveguiding part 12A has a thinner portion and a thicker portion. The sectional views of FIGS. 1A through 1G overall illustrate steps of formed claddings and cores on wider portion 16b of groove 16.

The length of the thinner portion of second cladding 13 is determined by the length (in the guiding direction) of wider portion 16b whereupon the length of wider portion 16b is set regarding refractive indexes and a length of connection of cladding and cores to obtain a desirable length of the thinner portion. The width (the length horizontally perpendicular to the guiding direction) and the depth of groove 16 determine the thickness of second cladding 13 that is formed on groove 16. In other words, widths of narrower portions 16a and wider portion 16b determine the thickness of the thinner and the thicker portions of second cladding 13, which has arbitrary desirable thicknesses. Therefore, the widths of narrower portions 16a and wider portion 16b are set regarding refractive indexes and a length of connection of cladding and cores to obtain a desirable varying thickness of second cladding 13.

In this example, groove 16 has taper portions 16c, of which widths become gradually narrower toward narrower portions 16a, between wider portion 16b and narrower portions 16a, as shown in FIG. 2, regarding a future forming of second core 14 on second cladding 13 (see FIG. 1F).

As a result, the presence of taper portions 16c, of which widths become gradually narrower, between narrower portions 16a and wider portion 16b of groove 16 causes second cladding 13 formed on the remaining first core 12 to have thicker (thicker layer) portions and a thinner (thinner layer) portion and to become gradually thinner from each of the thicker portions to the thinner portion, as shown by a double-doted chain line of FIG. 3. Namely, the thinner portion and each of the thicker portions are connected via an inclined portion, which is inclined with respect to a vertical direction, which is a direction of laminating the claddings and core and which is vertically perpendicular to the guiding direction.

When a waveguiding part 14A functioned by second core 14 is formed on second cladding 13 having the above-mentioned shape (see FIG. 1F), waveguiding part 14A of second core 14 has a portion (parallel portion, horizontal portion) parallel to waveguiding part 12A of first core 12, and an inclined portion that is inclined with respect to waveguiding part 12A in the vertical direction. In the illustrated example, the parallel portion of waveguiding part 14A of second core 14 includes a near section which is the closer to waveguiding part 12A of first core 12 than the other sections of waveguiding part 14A of second core 14 and far sections which are further from waveguiding part 12A of first core 12 than the closer section.

The presence of taper portions 16c, of which widths become gradually narrower, between narrower portions 16a and wider portion 16b of groove 16 prevents waveguiding part 14A of second core 14 from promptly bending (or curving) in the vertical direction thereby reducing the loss of light propagating through waveguiding part 14A.

The optical waveguide of the illustrated example assumes to be in the form of multi layers having taper portions 16c connect narrower portions 16a with wider portion 16b of groove 16 because of a later-described future forming of second core 14 on second cladding 13 (see FIG. 1F). Alternatively, when the optical waveguide takes the form of a single-layer phase controller described below, taper portion 16c may be not always necessary so that the contact points of narrower portions 16a and wider portion 16b are substantially perpendicular.

As shown in FIG. 2, groove 16 of the illustrated embodiment has two groove sections identical in geometry, symmetrically disposed on the both side of strip-shape convex part 16A. With groove 16 having the two groove sections, when second cladding 13 deposited on the remaining first core 12 i.e., waveguiding part 12A and non-waveguiding part 12B is reflowed, fused BPSG is flowed into the both groove sections equally whereupon second cladding 13 formed on groove 16 (especially on convex part 16A serving as waveguiding part 12A) are flattened.

In succession, BPSG of which basis is silicon dioxide in the form of particles doped with dopants of boron and phosphorous is deposited by FHD or the like on first cladding 11 and first core 12 remaining after the etching as shown in FIG. 1C (a depositing step). Then the BPSG deposited on first cladding 11 and first core 12 is fused by a heat treatment, as shown in FIG. 1D (a reflowing step).

Here, since second cladding 13 is formed by FHD having a step of vitrifying BPSG into transparent glass, the vitrifying step corresponds to the heat treatment performed in the reflowing step. Otherwise, if second cladding 13 is formed by growing a thin glass film using a method of chemical vapor deposition (CVD), a heat treatment is required to accomplish the reflowing step.

As a result, the fused BPSG is flowed equally into the two groove sections disposed at the both sides of waveguiding part 12A in the form of convex part 16A as shown in FIG. 1D whereupon BPSG is flattened (the reflowing step). At the same time, BPSG is vitrified into transparent glass thereby forming second cladding 13 (an intermediate cladding) (a first-core embedding step, second-cladding depositing/reflowing steps). Convex part 16A that is a part of the remaining first core 12 is embedded by first cladding 11 and second cladding 13 thereby forming a first waveguide (an embedded-type optical waveguide).

A substance of second cladding 13 appropriately has a lower melting point than substances of first cladding 11 and first core 12 so that only second cladding 13 is fused by the heat treatment carried out during the reflow step thereby being flattened.

The depositing/reflowing steps to form second cladding 13 may perform one time or may repeat several times to complete. The depositing/reflowing steps repeated several times makes possible to check the thickness of second cladding 13 each time whereupon second cladding 13 having a more desirable thickness can be obtained.

The above-mentioned successive steps fabricate a single-layer optical waveguide, and a multi-layer optical waveguide is fabricated by further performing the successive steps as shown in FIGS. 1E through 1G.

First of all as shown in FIG. 1E, GPSG, of which basis is silicon dioxide ($SiO_2$) in the form of particles doped with dopants of germanium and phosphorus, is deposited on the second cladding 13 formed by FHD or the like and then the deposited GPSG is vitrified into transparent glass to form a second core (upper core) 14. In contrast, first core 12 is also called a lower core.

Etching process, exemplified by a photo-lithography process and reactive ion etching (RIE) process, performed on the deposited second core 14 results in removing parts not required to guide light as shown in FIG. 1F thereby remains only waveguiding part 14A to guide light (a second-core etching step).

After that, BPSG of which basis is silicon dioxide in the form of particles doped with dopants of boron and phosphorous is deposited on second cladding 13 and second core 14 remaining after the etching by FHD, and then the deposited BPSG is vitrified into transparent glass to form a third cladding (upper cladding) 15 (a third-cladding forming step), as shown in FIG. 1G.

Waveguiding part 14A, which is the remaining part of second core 14 after the second-core etching step, is embedded by second cladding 13 and third cladding 15 (therefore called a second-core embedding step, a third-cladding depositing step, a core embedding step) so that a second waveguide is formed. The second waveguide is formed on the first optical waveguide, which has been fabricated by the above successive steps whereupon a multi-layer optical waveguide is fabricated. Third cladding 15 may be flattened by a heat treatment in the same fashion as second cladding 13.

FHD is performed to form first cladding 11, first core 12, second cladding 13, second core 14, and third cladding 15, however the forming method should by no means be limited to FHD. As an alternative, physical vapor deposition (PVD) of a sputtering method or CVD may also be used.

In the illustrated example, the substance of first to third cladding 11, 13, and 15 is BPSG (silica glass) of which basis is silicon dioxide in the form of particles doped with dopants of boron and phosphorous, and the substance of first and second core 12 and 14 is GPSG (silica glass) of which basis is silicon dioxide in the form of particles doped with dopants of germanium and phosphorus so that the optical waveguide is made from glass. The substances of each cladding or each core should by no means be limited to the materials, and may be resin or other material. Si substrate 10 is used in this example however should by no means be limited to silicon. Alternatively, the substances may be made from glass, crystal of insulator, compound semiconductors or plastic.

The fabricating method for an optical waveguide has the first-core etching step, in which first core 12 is etched into a channel shape, and the reflowing step, in which second cladding 13 is fused to flatten in addition to a conventional fabricating method. As a result, conventional method can be easily changed over to the fabricating method described with reference to the illustrated first embodiment. Further the fabricating method allows a simple forming of a cladding having a desirable (varying) thickness thereby realizing an optical waveguide in a further desirable design.

The fabricating method described above preferably applies to an optical waveguide (an optical waveguiding element) having the following optical device (element) (i) through (iii) added thereto and to an optical waveguide device having an electronic device (element), such as a heater and/or an electrode, added to waveguide. (i) First of all, a multi-layer waveguide-type optical directional coupler (a waveguide-type optical power divider/coupler) that is an optical waveguide having an additional function of an optical elements will be described with reference to FIGS. 4A through 4D. A multi-layer waveguide-type optical directional coupler (a multi-layer waveguide-type optical divider/coupler, a multi-layer waveguide-type optical coupler, a multi-layer waveguide-type functional element) in which an optical directional coupler (an optical divider/coupler, an optical coupler) is in the form of an optical waveguide.

The multi-layer waveguide-type optical directional coupler according to the first embodiment has two waveguide formed on Si substrate 30: a first waveguide formed by a first cladding 31, a first core 32 and a second cladding 33; and a second waveguide formed by second cladding 33, a second core 34 and a third cladding 35, as shown in FIGS. 4A through 4D. Second core 34, through which light is guided, of the second wavegude partially comes closer to first core 32, through which light is guided, of the first waveguide so that power of signal light propagate through first core 32 and second core 34 is coupled (or divided). The part that first core 32 and second core 34 come closer each other is called an optical coupling portion. For the convenience of the description, only first core 32 and second core 34 are marked respectively with bias lines and dots, as shown in FIGS. 4A through 4D.

The first waveguide is formed by embedding (buried) channel-shaped first core 32 with first cladding 31 and second cladding 33, which have lower refractive indexes than the first core 32, so that signal light to be propagated is enclosed in first core 32 and is guided through first core 32.

In the same manner, the second waveguide is formed by embedding (buried) channel-shaped second core 34 with second cladding 33 and third cladding 35, which have lower refractive indexes than the second core 34, so that signal light to be propagated is enclosed in second core 34 and is guided through second core 34.

In the illustrated example, first and second cores 32 and 34 are made from GPSG, which is silica glass in the form of particles doped with dopants of germanium and phosphorus, and first through third claddings 31, 33 and 35 are made from BPSG, which is silica glass in the form of particles doped with dopants of boron and phosphorus. Substances of cores and claddings should by no means be limited to the above-mentioned example.

Figure 4D:
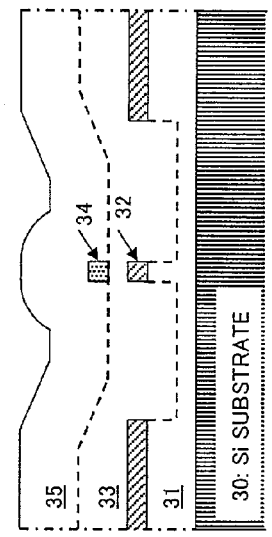
Figure 4A:
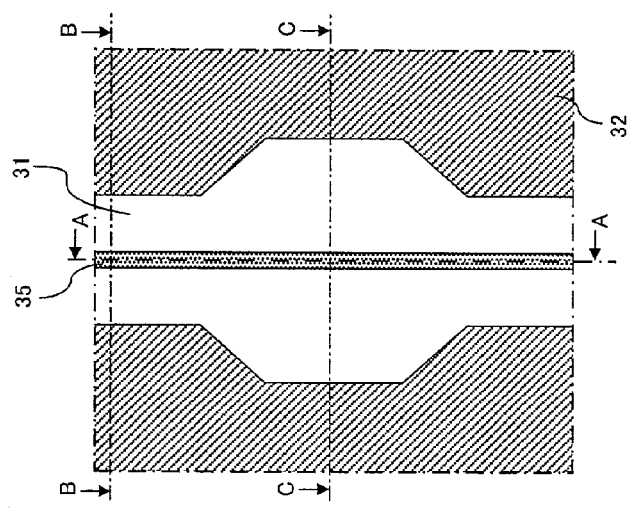
FIG. 4A is a top view showing a multi-layer waveguide-type optical directional coupler fabricated by the fabricating method of the first embodiment.

First core 32 of the illustrated example is a straight line in the guiding direction of guiding of light, as shown in FIG. 4A.

Figure 4C:
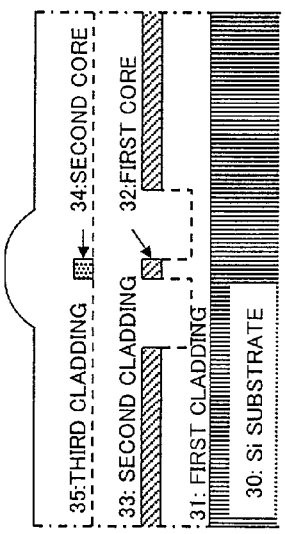

On the other hand, second core 34, formed on first core 32 with second cladding 33 interposed, is formed directly above first core 32 (in the upper vertical direction) so as to extend straight along first core 32 in the guiding direction (i.e., second core 34 is parallel to first core 32 in the guiding direction) as seen from the top side of the optical directional coupler, as shown in FIGS. 4A, 4C, and 4D.

Second core 34 is, as shown in FIG. 4B, bent (or curved) in the vertical direction (the direction of thickness of the optical waveguide) so that the combination of first core 32 and second core 34 serves as an optical coupler.

Namely, second core 34 (the second waveguiding part) has a parallel (horizontal) portion that is parallel to first core 32 (the first waveguiding part) disposed directly below in the vertical direction, and an inclined portion that is inclined with respect to first core 32 in the vertical direction. The parallel portion includes a near section (the optical coupling portion) which is closer to first core 32 and far sections which is further from first core 32 than the rest of second core 34. The inclined portion, having two sections in the accompanying drawings, is formed in order to have a predetermined angle of inclination regarding loss of light propagating through second core 34.

Second core 34 having the parallel portion and the inclined portion is realized by forming second (intermediate) cladding 33, disposed between first core 32 and second core 34, so as to have a varying thickness (i.e., by varying a thickness of a layer between waveguides), using the above fabricating method.

In order to form second core 34 having the near section, the far sections and the inclined portion, the thickness of second cladding 33 immediately below the near portion is formed to be thin; the thickness immediately below the far sections are formed to be thick; and the thickness immediately below the inclined portion is formed to gradually vary. As a result, second core 34 formed on the second cladding 33 having the above-mentioned thickness is bend or curved in the vertical direction. Further, it is possible for first and second core 32 and 34 to partially come closer even if the input and output sides of second core 34 directly above those of first core 32 (in the vertical direction) are relatively far.

At that time, wider portion 16b of groove 16 is etched so as to have a predetermined width at the etching step in which first core 32 is etched (see FIG. 2) in such a manner that second cladding 33 immediately below the near potion have a predetermined thickness suitable for coupling light propagating through first core 32 and second core 34. Wider portion 16b of groove 16 is etched at the etching step (see FIG. 2) so as to have a predetermined length in the guiding direction so that the optical coupler portion in which second core 34 come closer to first core 32 is a desired length in the guiding direction suitable for light coupling. The second-core etching step, in which second core 34 is etched, remains a second waveguide to guide light in the form of second core 34 directly above the first core 32.

Therefore, it is possible to fabricate an optical waveguide, of which the near portion that second core 34 comes partially closer to first core 32, serving as an optical directional coupler. For example, the multi-layer waveguide-type optical directional coupler distributes the power of signal light propagating through first core 32 to first core 32 and second core 34 at a predetermined rate (a coupling rate) in accordance with the length of the near portion in the guiding direction.

The multi-layer waveguide-type optical directional coupler can have two types of second core 34: that bending (curving) in the vertical direction; and that bending in the horizontal direction perpendicular to the guiding direction as seen from the top of the optical waveguide. Therefore, since the multi-layer waveguide-type optical directional coupler can take either one of the two types as being incorporated in an optical integrated circuit, it is possible for the optical integrated circuit to be designed further preferable arrangements therein. On the contrary, when various optical parts or elements are integrated on the multi-layer optical waveguide to produce PLC device (such as an optical integrated circuit and an optic-electronic integrated circuit), it is possible to realize the highly-integrated PLC device that is reduced in size.

The above-mentioned multi-layer waveguide-type optical directional coupler forms optical waveguide device serving as an optical multi-layer waveguide at which first core 32 and second core 34 partially come closer, simply by bending second core 34 in the vertical direction so as to entirely overlap the (core) pattern of second core 34 with the (core) pattern of first core 32 with respect to the vertical direction. The relational position between first core 32 and second core 34 should by no means be limited to the above example. Alternatively, the following modifications are suggested.

A multi-layer waveguide-type optical directional coupler according to a first modification includes a second core 24 bending (curving) in the horizontal direction perpendicular to the guiding direction in addition to bending (curving) in the vertical direction as shown in FIGS. 5A through 5D.

Namely, first core 22 of the first modification is a straight line formed along the guiding direction as shown in FIGS. 5A through 5D.

On the other hand, second core 24 formed above first core 22 with second cladding 23 interposed is bent (curved) in the horizontal direction (perpendicular to the guiding direction, i.e., the direction of the width of the optical waveguide) as shown in FIGS. 5A, 5C and 5D, and is also bent (curved) in the vertical direction (the direction of the depth of the optical waveguide) as shown in FIG. 5B.

A portion of second core 24, which portion is in the form of a straight line, is formed directly above first core 22 (along first core 22 in vertical direction; parallel to first core 22 in the vertical direction) whereupon an optical coupling portion at which second core 24 comes closer to first core 22 is formed.

The input and output sides of second core 24 are arranged at positions shifted from positions directly above the waveguide of first core 22 in the direction perpendicular to the guiding direction so that a part of second core 24 is directly above first core 22.

Second core 24 (the second waveguiding part) has a parallel portion (horizontal portion) parallel to first core 22 (first waveguiding part), which is arranged lower position in the vertical direction than second core 24, and an inclined portion that is inclined with respect to first core 22 in the vertical direction (of laminating cores and claddings). The parallel portion includes a near section which is closer to first core 22 and far sections which are further from first core 22. The inclined portion, having two sections in the accompanying drawings, is formed so as to have a predetermined angle of inclination regarding loss of light propagating through second core 24.

The shape of second core 24 causes first core 22 and second core 24 to come close enough to perform an optical coupling at an optical coupling portion and at the same an sufficient distance is guaranteed between first core 22 and second core 24 except the optical coupling portion. In other words, it is possible to form second cladding 23 disposed between first core 22 and second core 24 having sufficiently thin thereby fabricating an optical waveguide extremely integrated components thereon.

Figure 6B:
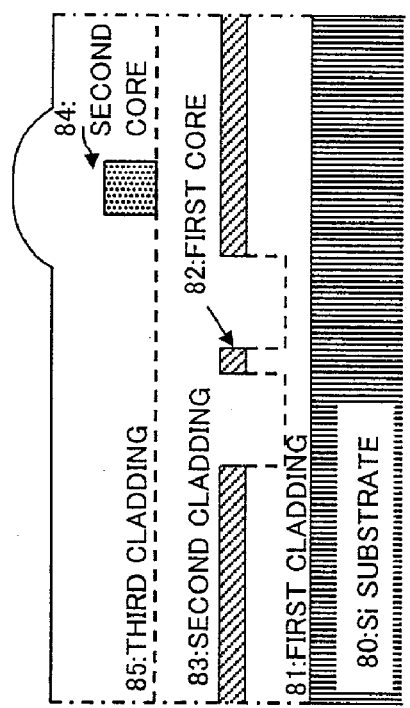
FIGS. 6B, and 6C are sectional views respectively showing the multi-layer waveguide-type optical direction coupler of FIG. 6A sectioned by lines A—A, B—B, and C—C, respectively.
Figure 6C:
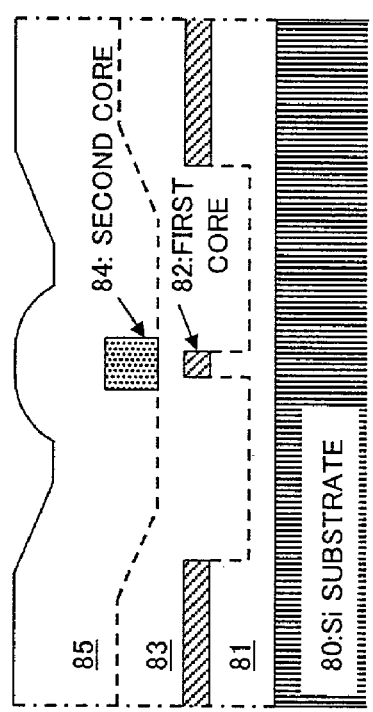
Figure 6A:
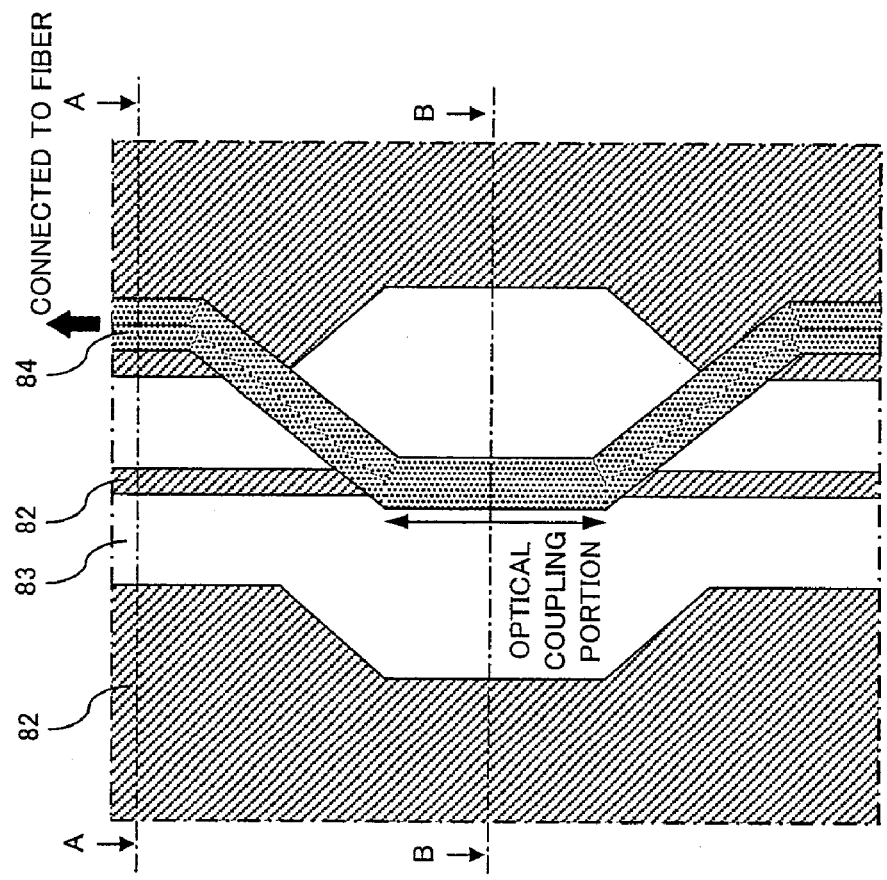
FIG. 6A is a top view showing a multi-layer waveguide-type optical directional coupler according to a second modification of that of FIG. 4A.
Figure 7B:
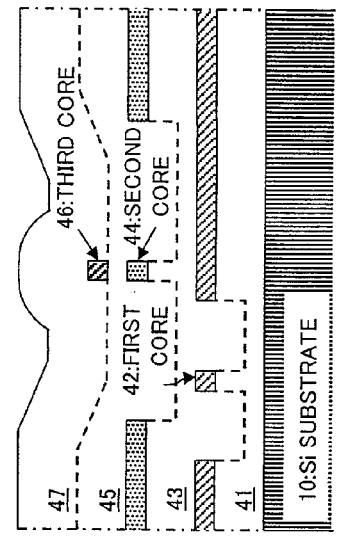
FIGS. 7B, 7C and 7D are sectional views respectively showing the multi-layer waveguide-type optical direction coupler of FIG. 7A sectioned by lines A—A, B—B, and C—C, respectively.
Figure 7A:
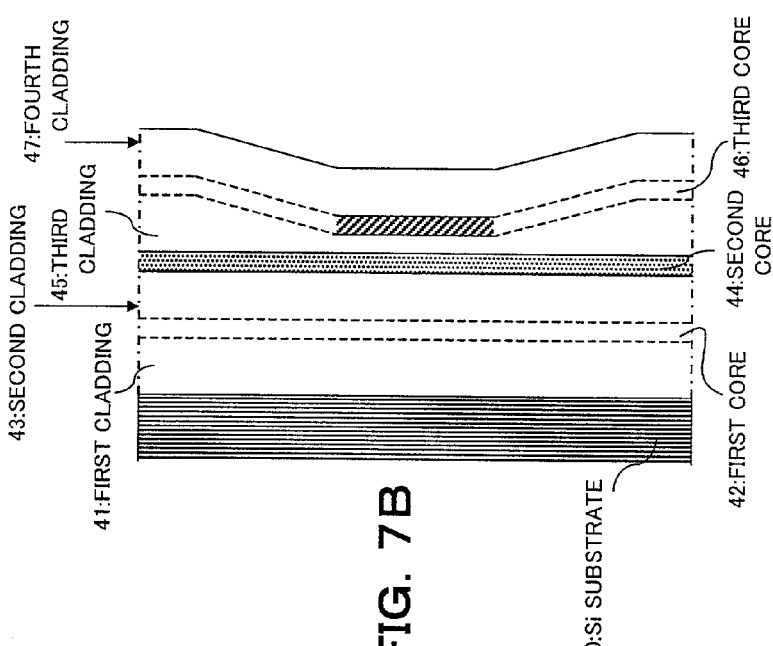
FIG. 7A is a top view showing a multi-layer waveguide-type optical directional coupler according to a third modification of that of FIG. 4A.
Figure 7D:
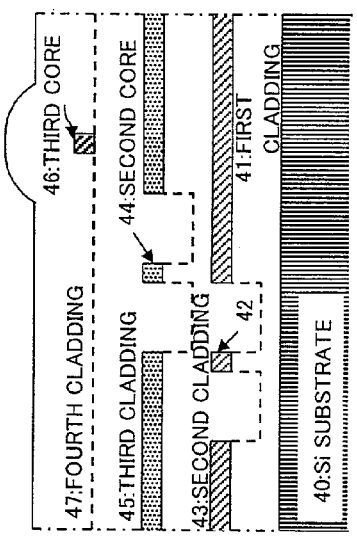
Figure 7C:
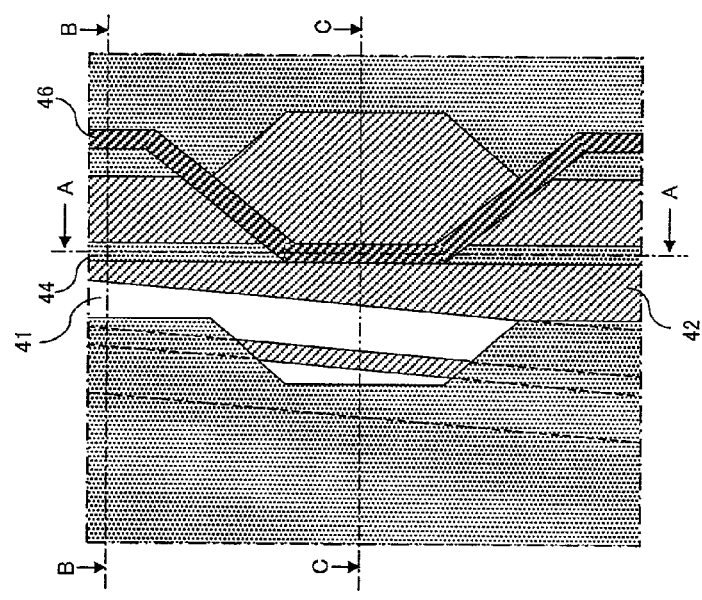

A multi-layer waveguide-type optical directional coupler according to a second modification includes a second core 84 bent (curved) in the horizontal direction in addition to in the vertical direction, as shown in FIGS. 6A, 6B and 6C. Further, a first waveguide formed by a first cladding 81, a first core 82 and a second cladding 83 has a relative refractive index difference $\Delta 1$ (.delta.1) different from a relative refractive index difference $\Delta 2$ (.delta.2) of a second waveguide formed by second cladding 83, second core 84 and third cladding 85.

Second core 84 (second wavegude) has a parallel portion (horizontal portion) parallel to first core 82 (first waveguiding part), which is arranged lower position than second core 84, and an inclined portion that is inclined with respect to first core 82 in the vertical direction, which is a direction of laminating cores and claddings. Here, the parallel portion of second core 84 includes a near section closer to the first core 82 and far sections further from the first core 82 than the rest of second core 84. The inclined portion, having two sections in the accompanying drawings, is formed in order to have a predetermined angle of inclination regarding loss of light propagating through second core 84.

As shown in an example of FIGS. 6A through 6C, when the relative refractive index difference $\Delta 2$ of the second waveguide is set to be smaller than the relative refractive index difference $\Delta 1$ of the first waveguide, the mode field diameter of the second waveguide becomes larger thereby closing to the mode field diameter of an optical fiber to be connected thereto. As a result, it is possible to reduce coupling loss between the second waveguide and an optical fiber connected thereto if the mode field diameter of the second waveguide is large. The above fabricating method preferably applie to various types of waveguides in accordance with their requirements.

In the illustrated example of the second modification, the relative refractive index difference $\Delta 2$ of the second waveguide is smaller than that of the first waveguide ($\Delta 1$). Alternatively, the relative refractive index difference $\Delta 1$ of the first waveguide may be smaller than that of the second waveguide ($\Delta 2$) and therefore the first waveguide is connected to an optical fiber. Otherwise, second core 84 is bent (curved) in the horizontal direction and the vertical direction in this example, however should by no means be limited to the bent shape. As an alternative, second core 84 may be bent (curved) in the vertical direction and the relative refractive index difference $\Delta 2$ thereof may be set different from that of first core 82 ($\Delta 1$).

In the above mentioned examples, a second core comes partially closer to a first core arranged below the second core by bending (curving) the second core in the horizontal direction and/or the vertical direction. Conversely, a first core may be bent (curved) in the horizontal direction and/or the vertical direction so as to partially come closer to a second core.

A multi-layer waveguide-type optical directional coupler according to a third modification is three-layer having: a first wavegude formed by a first cladding 41, a first core 42 and a second cladding 43; a second waveguide formed by second cladding 43, a second core 44 and a third cladding 45; and a third waveguide formed by third cladding 45, a third core 46 and a fourth cladding 47, as shown in FIGS. 7A through 7D, in contrast to the above-mentioned embodiment and modifications that have two layers.

In the illustrated modification, third core 46 is bent (curved) in the vertical direction and additionally in the horizontal direction, as shown in FIGS. 7A through 7D, thereby coming partially closer to second core 44 so that the combination of the second waveguide and the third waveguide serves as an optical directional coupler.

Third core 46 (the third waveguide part) has a parallel portion (horizontal portion) parallel to second core 44 arranged lower position in the vertical direction, and a inclined portion that is inclined with respect to second core 44 in the vertical direction. The parallel portion includes a near section which are closer to second core 44 and far sections which is further from second core 44 the rest of third cladding 46. The inclined portion, having two sections in the accompanying drawings, is formed so as to have a predetermined angle of inclination regarding loss of light propagating through third core 46.

The first waveguide of the illustrated example serves only to guide light, however as an alternative, a part of first core 42, not appeared in FIGS. 7A through 7D, may come partially close to second core 44 forming the second waveguide or to third core 46 forming the third wavegude so that the combination of the first waveguide and the second (or third) waveguide also serves and an optical directional coupler. In other words, for example, a part of second core 44, which part is except the part where serving as the optical directional coupler by cooperating with third core 46, comes closer to first core 42 whereupon the combination of the part of second core 44 and first core 42 functions as an optical coupler. Further, it is possible for an optical waveguide of the present invention to comprise a plurality of optical couplers by forming arbitrary two cores so as to come partially closer.

Further, third core 46 of the illustrated example is bent (curved) in the horizontal direction and in the vertical direction that is in the direction of laminating cores and claddings so that the second core 44 and third core 46 partially comes closer thereby serving as an optical directional coupler, however should by no means be limited to the above example. As an alternative, the combination of first core 42 and second core 44 may serve as an optical directional coupler by bending (curving) second core 44 in the vertical direction (or in the horizontal direction) in such a manner that a part of second core 44 comes closer to first core 42. As another alternative, the combination of first core 42 and third core 46 may serve as an optical directional coupler by bending (curving) third core 46 in the vertical direction (or in the horizontal direction) in such a manner that a part of third core 46 comes closer to first core 42.

The waveguides described previously has three layers (i.e., waveguides). The number of layers of an optical waveguide should by no means be limited to two or three, and an optical waveguide may have arbitrary layers following to requirements.

Third core 46 is bent (curved) in the horizontal direction and in the vertical direction, however should by no means be limited to bending with respect to two directions. Alternatively, third core 46 may be bend (curved) only in the vertical direction.

(ii) As a second example, a multi-layer waveguide-type multimode interference (MMI) optical coupler (a waveguide-type MMI optical divider/coupler, a multi-layer waveguide-type MMI optical coupler, a waveguide-type MMI optical coupler, a waveguide-type functional element) in the form of an optical waveguide will be described with reference to FIGS. 8A and 8B.

Multi-layer waveguide-type optical directional coupler, through which loss of light propagating is relatively small, has respective different lengths of coupling, each for each of different signal light having respective different wavelengths, whereupon the dividing ratio has a large wavelength dependence. Conversely, a multi-layer MMI optical coupler has a small wavelength dependence and therefore is suitable for being used as a device require such a feature.

Figure 8B:
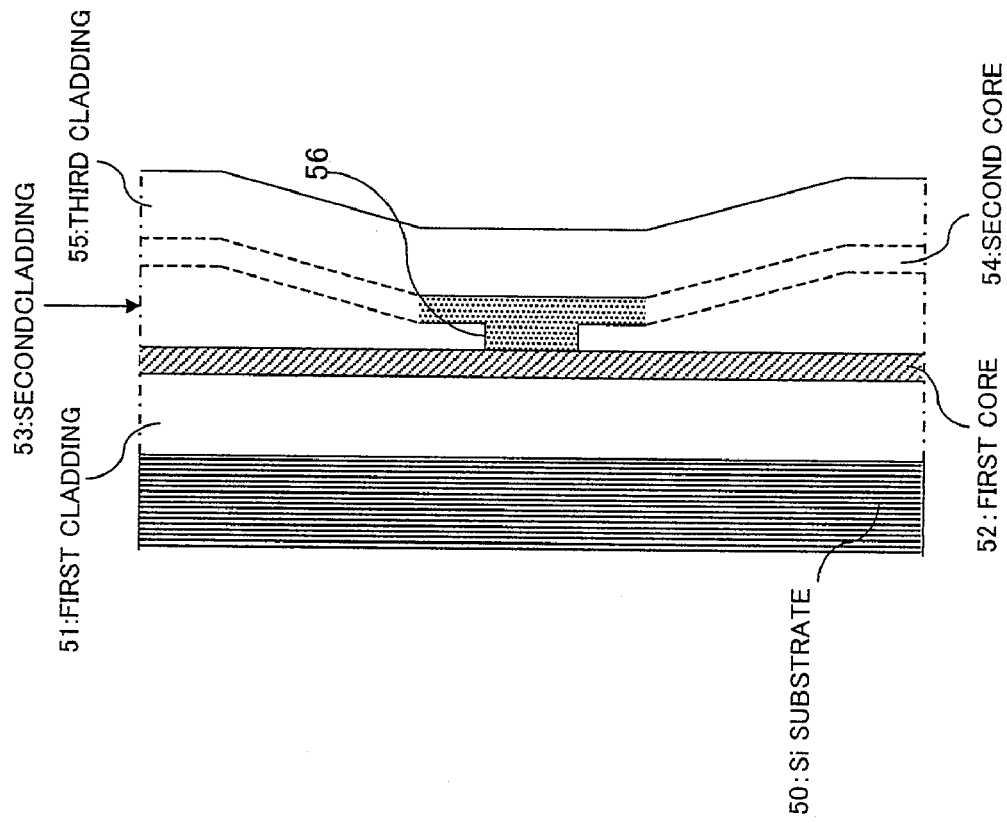
FIG. 8B is sectional view showing the multi-layer waveguide-type multimode interference optical coupler of FIG. 8A sectioned by line A—A.
Figure 8A:
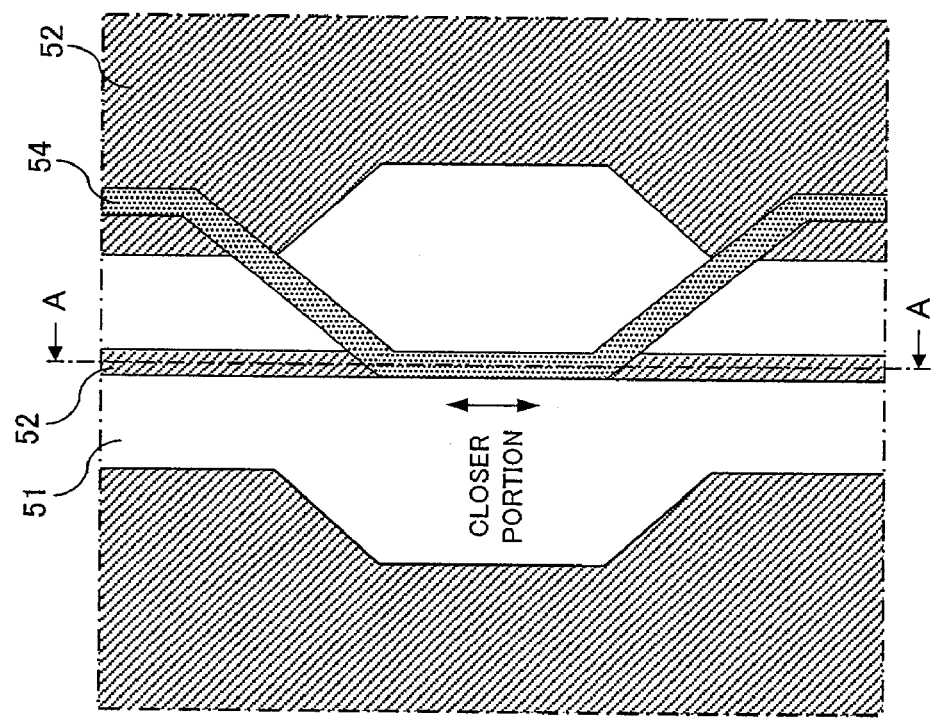
FIG. 8A is a top view showing a multi-layer waveguide-type multimode interference optical coupler fabricated by the fabricating method of the first embodiment.

A multi-layer waveguide-type MMI optical coupler has a first waveguide formed by first a cladding 51, a first core 52 and a second cladding 53, and a second waveguide formed by second cladding 53, a second core 54 and a third cladding 55, on a Si substrate 50 as shown in FIGS. 8A and 8B. The first and the second wavegude guide signal light to be propagated through first and second cores 52 and 54, respectively. The multi-layer waveguide-type MMI optical coupler further includes a connecting section 56, which is formed at the portion that first core 52 serving as the first waveguide and second core 54 serving as the second waveguide partially come closer (a closer portion, i.e., a thinner part of second cladding 53), to couple (or divide) the power of one or more signal light propagates through the first and the second waveguides. For the convenience of the description, only first core 52 and second core 54 are marked respectively with bias lines and dots, as shown in FIGS. 8A and 8B.

The first waveguide is formed by embedding channel-shaped first core 52 with first cladding 51 and second cladding 53, which have lower refractive indexes than the first core 52, so that signal light to be propagated is enclosed in first core 52 and is guided through first core 52.

In the same manner, the second waveguide formed is by embedding (enclosing) channel-shaped second core 54 with second cladding 53 and third cladding 55, which have lower refractive indexes than the second core 54, so that signal light to be propagated is enclosed in second core 54 and is guided through second core 54.

In the illustrated example, first and second cores 52 and 54 are made from GPSG, which is silica glass in the form of particles doped with dopants of germanium and phosphorus, and first through third claddings 51, 53 and 55 are made from BPSG, which is silica glass in the form of particles doped with dopants of boron and phosphorus. Substances of cores and claddings should by no means be limited to the above-mentioned example (i.e., glass made from BPSG and GPSG).

Here, for example, second core 54 is bent (curved) in the vertical direction (i.e., a direction of laminating of claddings and cores) and further bent in the horizontal direction perpendicular to the guiding direction as seen form the top side, as shown in FIGS. 8A and 8B.

On the contrary, first core 52 is formed into a straight line extends in the guiding direction, as shown in the accompanying drawings.

Second core 54 formed on first core 52 with second cladding 53 interposed is bent (curved) in the horizontal direction (bent to the width direction of the optical waveguide) as shown in FIG. 8A, and is also bent (curved) in the vertical direction (the direction of laminating cores and cladding, i.e., the direction of the thickness of the optical waveguide) as shown in FIG. 8B.

A portion of second core 54, which part is a straight line, is formed directly above (i.e., parallel to) first core 52 so that second core 54 has a closer portion at which second core 54 comes closer to first core 52 than the other portion of second core 54 as shown in FIG. 8B. Namely, the input and the output side of second core 54 are arranged at positions shifted in the horizontal direction perpendicular to the guiding direction from positions directly above first core 52 whereupon second core 54 is partially arranged directly above first core 52.

Second core 54 has a parallel (horizontal) portion that is parallel to first core 52 disposed below, and an inclined portion that is inclined with respect to first core 52 in the vertical direction. The parallel portion includes a near section which is closer to first core 52 and far sections which are further from first core 52 than the rest of second core 54. The inclined portion, having two sections in the accompanying drawings, is formed so as to have a predetermined angle of inclination regarding loss of light propagating through second core 54.

As shown in FIG. 8B, the presence of connecting section 56 disposed at the near section realizes a connected-type multi-layer MMI optical coupler in which first core 52 and second core 54 are partially connected.

In order of fabricate such a multi-layer MMI optical coupler, after the reflowing step in which second cladding 53 has been flattened, a part of second cladding 53, which part is directly above the first waveguiding part of first core 52 as a consequence of the first-core etching step, is dug so as to make a hole penetrating second cladding 53, as shown in FIGS. 8A and 8B (a digging step). Subsequently, second core 54 is formed on second cladding 53 so as to bury the hole (a second-core forming step), and then the formed second core 54 is etched in such a manner that the remaining second core 54, which serves as the second waveguide to guide light, is connected to the hole buried (a second-core etching step). After the second-core etching step, the remaining second core 54 after the immediate previous etching is embedded with third cladding 55 (a second-core embedding step/a third core forming step).

Burying the hole made through second cladding 53 with second core 54 dents the top surface of second core 54. As a solution, second core 54 is flattened by reflowing or by a method of chemical mechanical polishing (CMP) in which the top surface second core 54 is planed.

In the illustrated example of FIGS. 8A and 8B, a hole is made at the closer portion between first core 52 and second core 54 and the hole is buried with second core 54 to form connecting section 56 that connects first core 52 and second core 54.

The above method to fabricate an optical waveguide realizes a thin layer of second cladding 53, which is disposed between first core 52 and second core 54 (that is, the distance between the first and second waveguides can be thinner). Advantageously, the fabricating method allows a simple forming of a cladding having a desirable (varying) thickness thereby realizing the multi-layer MMI optical coupler of the illustrated embodiment, which performs a different type of optical coupling from the above-mentioned multi-layer waveguide-type optical directional coupler, also in a further desirable design. Further, partly since the fabricating method additionally requires the digging step as compared with the fabricating method for the optical directional coupler and partly since connecting section 56 is realized by simple process(es), a multi-layer waveguide-type MMI optical coupler can also fabricated with ease.

Forming connecting section 56 at the closer portion of first core 52 and second core 54 allows the remaining portion of second cladding 53 (i.e., except at connecting section 56) to be sufficiently thick thereby eliminating the possibility of unexpected light coupling.

The illustrated fabricating method can make second core 54 come partially close to first core 52 in the vertical direction and can make connecting section 56 at the closer portion. A multi-layer waveguide-type MMI optical coupler of the illustrated example can be installed various positions on an optical integrated circuit because of the above feature of the coupler. On the contrary, when various optical parts or elements are integrated on a multi-layer waveguide-type MMI optical coupler to produce PLC device (such as an optical integrated circuit and an optic-electronic integrated circuit), it is possible to realize the highly-integrated PLC device that is reduced in size.

In the illustrated fabricating method for a multi-layer waveguide-type MMI optical coupler makes a hole by etching and buries the hole with second core 54 to form connecting section 56, however the forming manner of connecting section 56 should by no means be limited to the illustrated example. As an alternative, the following modifications may be suggested.

Figure 9B:
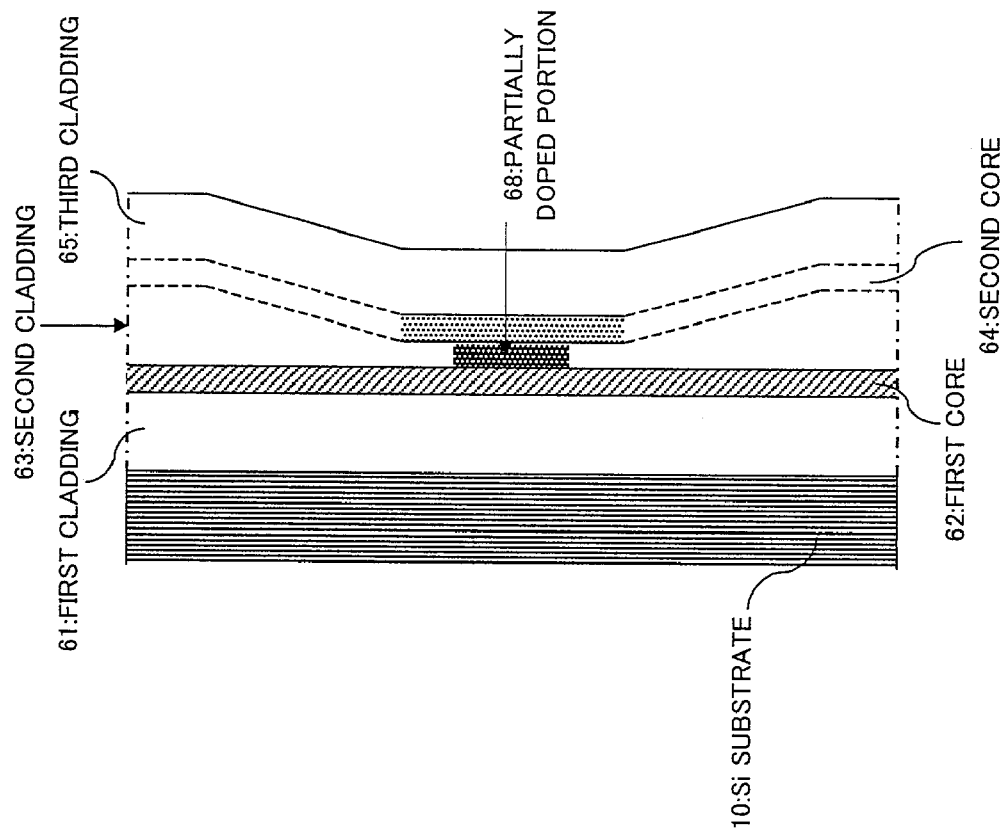
FIG. 9B is sectional view showing the multi-layer waveguide-type multimode interference optical coupler of FIG. 9A sectioned by line A—A.
Figure 9A:
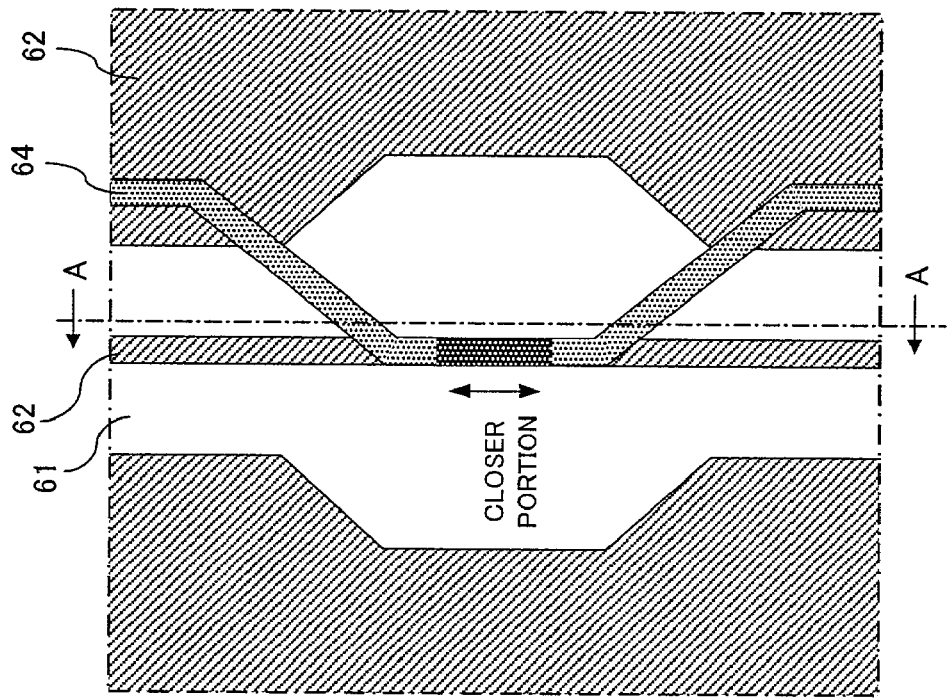
FIG. 9A is a top view showing a multi-layer waveguide-type multimode interference optical coupler according to a modification of that of FIG. 8A.

As shown in FIGS. 9A and 9B, a thinner portion of a second cladding 63 formed between a first core 62 and second core 64 is additionally doped (ion-doped) with dopants, such as phosphorus and germanium, that partially boosts the refractive index so that the doped portion 68 serving as a connecting section to connect first core 62 and second core 64.

The manner of the doping (ion-doping) is exemplified by technique of ion implantation, ion diffuse, ion exchange, however other manner may be also suggested in order to form doped portion 68.

In this case, a multi-layer waveguide-type MMI optical coupler is fabricated by: at the reflowing step (see FIG. 1D), (1) doping a part of second cladding 63, which part is directly above the first waveguide that is remaining first core 62 after the etching, to form doped portion 68 as shown in FIGS. 9A and 9B (a doping step); (2) forming second core 64 on second cladding 63 (a second-core forming step); (3) etching second core 64 in such a manner that the remaining second core 64 serving as the second waveguide is connected to doped portion 68 (a second-core etching step); and (4) embedding the remaining second core 64 after the second-core etching step with third cladding 65 (a second-core embedding step).

The closer portion at which second core 64 comes closer to first core 62, in other words a portion that second cladding 63 is thinner than the other portion, is doped in such a manner that a portion of second cladding 63 has a refractive index substantially identical with that of second core 64. Whereupon doped portion 68 is formed and the fabricated optical waveguide serve to function as a multi-layer waveguide-type MMI optical coupler in which first core 62 is partially connected to second core 64.

It is difficult former fabricating method to flatten the top surface of second core 64, which at the same time buries the hole to serve as the connecting section 56. On the contrary, the illustrated method realizes a connecting section having a substantially same refractive index as second core 64 and second core 64 of which top surface is flattened despite low accuracy of the doping.

Similar to the above-mentioned multi-layer waveguide-type optical directional coupler, the relative refractive index difference Δ1 of the first waveguide can be set one different from that of the second waveguide (i.e., Δ2).

If the relative refractive index difference Δ2 of the second wavegude is smaller than that of the first wavegude (Δ1), the mode-field diameter of the second waveguide comes closer to that of an optical fiber. For this reason, it is possible to reduce the loss of coupling between the multi-layer waveguide-type MMI optical coupler and an optical fiber if the second waveguide is connected to the optical fiber so that the fabricating method of the illustrating example is preferably apply to designs of various types of waveguides.

Here, the relative refractive index difference Δ2 of the second waveguide is smaller than that of the first waveguide (Δ1). Alternatively, the relative refractive index difference Δ1 of the first waveguide may be smaller than that of the second waveguide (Δ2) and therefore the first waveguide is connected to an optical fiber.

The description about the optical device or elements in segments (i), (ii) is made on a multi-layer waveguide-type optical directional coupler and an MMI coupler fabricated by a method to fabricating the optical waveguide of the first embodiment. The fabricating method should by no means be limited to fabricating waveguide-type optical couplers (coupler/divider, multiplexer/demultiplexer) of the described examples, and alternatively applies to optical waveguides (a waveguiding element, a waveguide-type functional element) having other optical device or elements (e.g., a waveguiding-type optical wave coupler, a waveguide-type divider/coupler, a waveguide-type multiplexer/demultiplexer) added thereto.

Further, the multi-layer waveguide-type optical directional coupler and the multi-layer waveguide-type MMI optical coupler may have one or more electronic elements, such as an electrode, that are capable of controlling the electric field, the magnetic field, sound, and heat thereby varying the refractive index or the absorption coefficient. Whereupon the variation in refractive index or in absorption coefficient realizes an optical waveguide device (e.g., an optical switch, an optical (intensity) modulator, optical deflector) utilizing physical effect exemplified by electro-optic (EO) effect, magneto-optic (MO) effect, acousto-optic (AO) effect, and thermo-optic (TO) effect.

(iii) A (waveguide-type) phase controller to which an electronic circuit having one or more electronic devices (electronic elements), such as a heater and/or an electrode, is added to utilize TO effect will be described as the third example of an optical waveguide device with reference to FIGS. 10A and 10B. A heater or an electrode added on the optical waveguide device controls the refractive index of the waveguide (especially a core).

A phase controller takes the form of a single-layer optical waveguide, which is fabricated the following method.

First of all, steps from the first-core forming to the reflowing described with respect to the first embodiment (see FIGS. 1A through 1D) are performed so as to fabricate a single-layer optical waveguide.

Figure 10B:
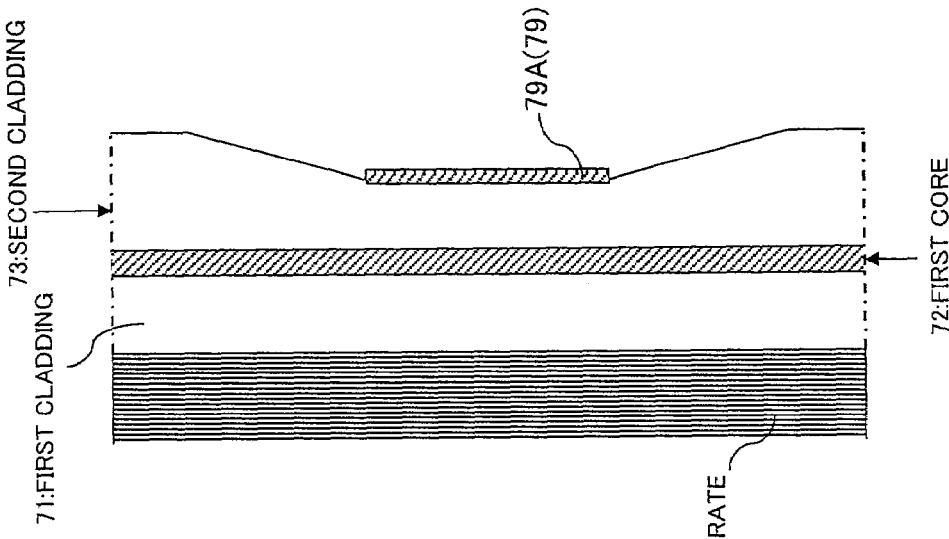
FIG. 10B is a sectional view showing the waveguide-type phase controller of FIG. 10A sectioned by line A—A.
Figure 10A:
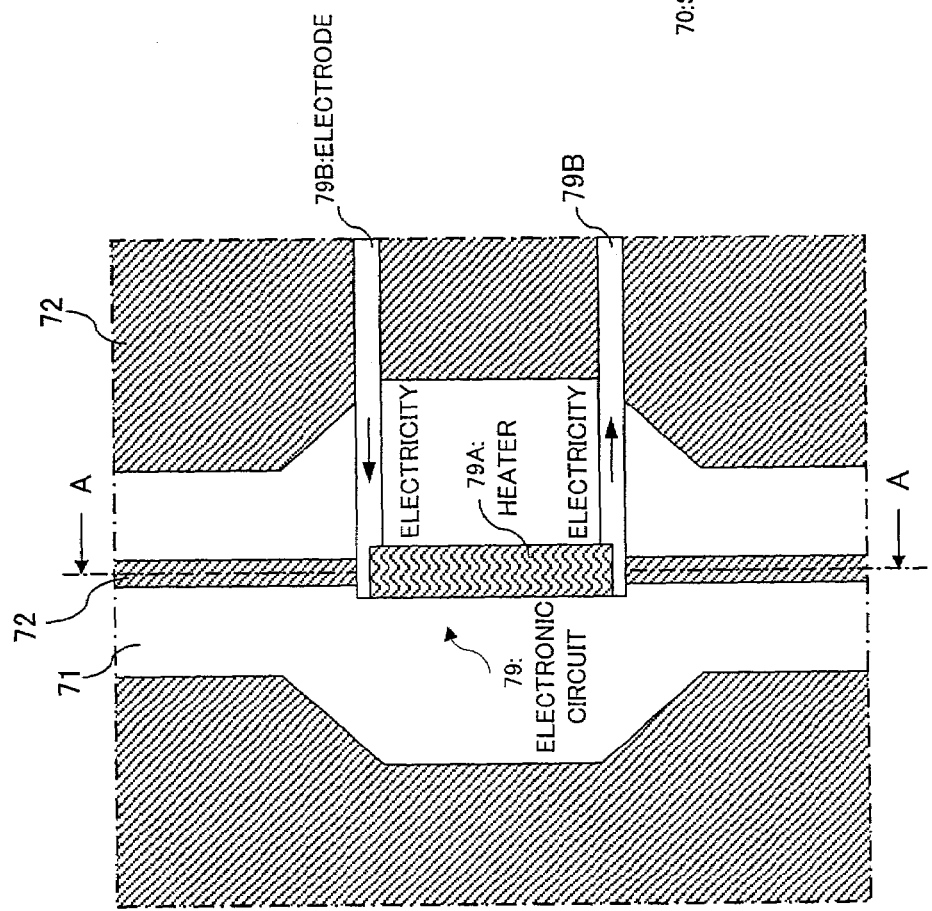
FIG. 10A is atop view showing a waveguide-type phase controller fabricated by the fabricating method of the first embodiment.
Figure 11B:
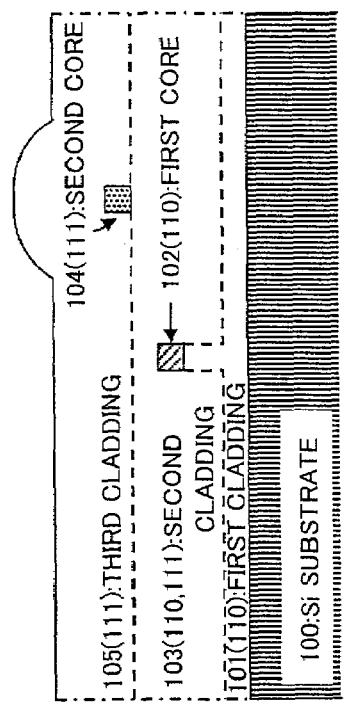
FIGS. 11B and 11C are sectional view respectively showing the conventional multi-layer waveguide-type optical directional coupler of FIG. 10A sectioned by lines A—A and B—B, respectively.
Figure 11C:
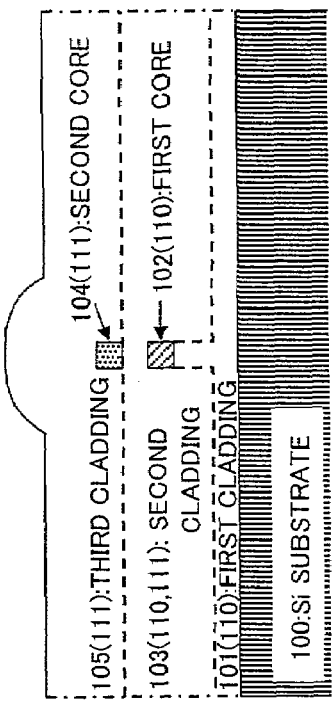
Figure 11A:
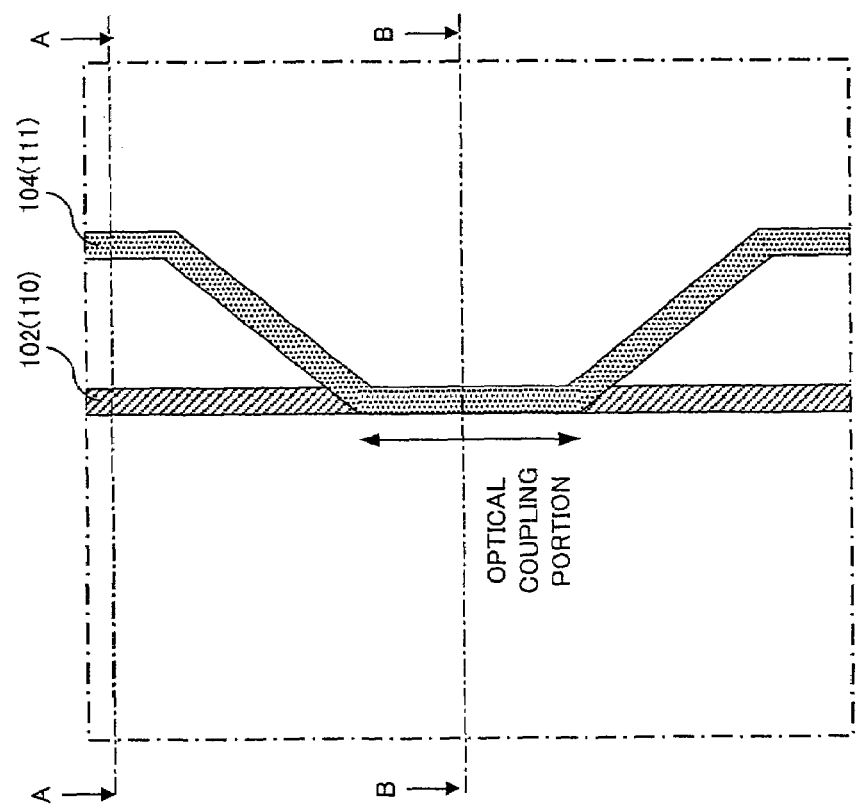
FIG. 11A is a top view illustrating a conventional multi-layer waveguide-type optical directional coupler.

The single-layer optical waveguide comprises a first cladding 71, a first core 72 and a second cladding 73 sequentially laminated on a Si substrate 70, as shown in FIGS. 10A and 10B. For the convenience of the description, only first core 72 is marked respectively with bias lines in the accompanying drawings.

The single-layer optical waveguide is formed by embedding channel-shaped first core 72 with first cladding 71 and second cladding 73, which has lower indexes than the first core 72, so that signal light to be propagated is enclosed in first core 72 and is guided through first core 72.

For example, first core 72 is made from GPSG, which is silica glass in the form of particles doped with dopants of germanium and phosphorus, and first and second claddings 71 and 73 are made from BPSG, which is silica glass in the form of particles doped with dopants of boron and phosphorus. Substances of cores and claddings should by no means be limited to the above-mentioned example of glass made of BPSG and GPSG.

First core 72 is formed into a straight line extending in the guiding direction of the light guiding, as shown in FIGS. 10A and 10B.

On the other hand, second cladding 73 formed upper side (the opposite side from Si substrate 70) of the waveguide, through which light is guided and which is formed by first core 72, has a varying thickness in the waveguiding direction, as shown in FIG. 10A.

As shown in FIG. 10B, second cladding 73 has a thinner portion (thinner layer portion), and a thicker portion (thicker layer portion), which is divided into two sections, and becomes gradually thinner from each section of the thicker portion to the thinner portion. Namely, the thinner portion and each section of the thicker portion are connected via an inclined portion, which is inclined in the vertical direction, which is a laminating direction of claddings 71 and 73 and core 72. The shape of second cladding 73 should by no means be limited to the above example having the inclined portion. Alternatively, second cladding 73 may be directly connected without the inclined portions the contact points of the ticker and thinner portion make substantial perpendicular.

In the illustrating example, a heater 79A is installed at the thinner portion of second cladding 73 formed on first core 72, which portion is to serve to function as a phase controller, thereby heating the optical waveguide (first cladding 71, first core 72, and second cladding 73) so as to cause TO effect. As a result, the optical waveguide with heater 79A serves as a phase controller. Electrodes 79B are connected to heater 79A and supply electricity to heater 79A. The electronic elements, i.e. heater 79A and electrodes 79B constitute an electronic circuit 79. It is therefore possible to assume that electronic circuit 79 is installed at the thinner portion of a cladding serving as a part of the optical waveguide.

Since the refractive index of the optical waveguide, having the above configuration, is varied by controlling electricity supplied to heater 79A, the optical waveguide serves as a phase controller to adjust the phase of signal light, as a consequence.

Specifically in this example, second cladding 73 has a varying thickness and heater 79A, which is to be installed at a portion serving as a phase controller, is installed at the thinner portion of second cladding 73. The thinner portion transmits heat faster than other portion as conducting electricity through heater 79A to heat the optical waveguide whereupon a variation in refractive index of the optical waveguide can be guaranteed. Conversely, the other part of second cladding 73 except the part at which heater 79A is installed (the other part requires no variation in refractive index) is thicker than the part with heater 79A. As a consequence, the possibility of heat transmission to the other part is reduced and the refractive index of the other part is maintained whereupon a phase controller with high accuracy can be realized.

The fabricating method described with respect to the first embodiment also efficiently applies to a single-layer optical waveguide.

Since a phase controller is fabricated by installing heater 79A at a thinner portion of second cladding 73, it is possible to arrange a waveguide-type phase controller at a further desirable position on an optical integrated circuit, thereby designing an optical integrated circuit having more desirable arrangements of various elements thereon. Further, it is possible to realize a highly-integrated PLC device (such as an optical integrated circuit and an optic-electronic integrated circuit) which is a multi-layer optical waveguide on which various optical part are integrated, and as a result the PLC device is allowed to be small in size.

The phase controller of the example is a single-layer optical waveguide including heater 79A constitutes electronic circuit 79, however should by no means be limited to such a configuration. Alternatively, a phase controller is fabricated by installing heater 79A constitutes electronic circuit 79 in a multi-layer optical waveguide. For example, a phase controller (an optical waveguide device) may be fabricated by installing heater 79A in a multi-layer optical waveguide serving as the multi-layer waveguide-type optical directional coupler and the multi-layer waveguide-type MMI optical coupler that are described above.

Still further, the phase controller described above controls the refractive index of the optical waveguide by utilizing TO effect to accomplish its function. The controlling of the refractive index should by no limited to be carried out by TO effect, and alternatively other physical effects, such as EO effect, may be used to realize the function of a phase controller (a waveguide-type phase controller). In this alternative, a phase controller can be realized by EO effect when electrodes constituting an electronic circuit are installed at a cladding of an optical waveguide, which cladding has a thicker portion and a thinner portion, because the installed electrodes can vary electric intensity even if a height of voltage applied is constant.

Further, the present invention should by no means be limited to the foregoing embodiment and the various modifications, and various changes or other modifications may be suggested without departing from the gist of the invention.

What is claimed is:

1. A multi-layer optical waveguide formed on a substrate comprising:
   a first core including
      a waveguiding part guiding light;
      a non-waveguiding part guiding no light, which includes two non-waveguiding sections, each arranged on opposite sides, respectively, of said waveguiding part; and
   portions of a cladding burying grooves defined by said waveguiding part and each of said two non-waveguiding sections and formed so as to have varying widths in a guiding direction, respectively, and other portions of the cladding formed on said waveguiding part having a varying thickness in the guiding direction corresponding to the widths of the grooves;
   a second core, formed on the cladding, comprising a waveguiding part guiding light, the waveguiding part of said second core including a portion thereof angled in a direction relative to the substrate corresponding to the thickness of the cladding formed on said waveguiding part of said first core, to thereby change a position of said waveguiding part of the second core in a layering direction.

2. An optical waveguide according to claim 1, wherein said portions of said cladding, which bury said grooves, are identical in geometry.

3. An optical waveguide according to claim 1, further comprising another cladding formed between said first core and the substrate,
   bottoms of said portions of the first-named cladding, which bury said grooves, being lower than said first core.

4. An optical waveguide according to claim 1, wherein said cladding has a lower melting point than said first core.

5. An optical waveguide according to claim 1, further comprising an electronic circuit disposed at a portion of said cladding, said portion being thinner than the remaining portion of said cladding.

6. A multi-layer optical waveguide formed on a substrate comprising:
   a first core including
      a waveguiding part guiding light and
      a non-waveguiding part guiding no light;
   a cladding burying said waveguiding part and grooves defined by said waveguiding part and said non-waveguiding part and formed so as to have varying widths in a guiding direction, the cladding formed on said waveguiding part having a varying thickness in the guiding direction corresponding to the widths of the grooves; and
   a second core, formed on said cladding;
   comprising a waveguiding part guiding light, the waveguiding part of said second core including a portion thereof angled in a direction relative to the substrate corresponding to the thickness of the cladding formed on said waveguiding part of said first core, to thereby change a position of said waveguiding part of the second core in a layering direction so that at least one part of said waveguiding part of said second core comes closer to said waveguiding part of said first core.

7. An optical waveguide according to claim 6, wherein said second core is in the shape of a thin strip arranged directly above said waveguiding part of said first core.

8. An optical waveguide according to claim 6, wherein an input-side and an output-side of said second core are arranged at positions shifted from positions directly above said waveguiding part of said first core in a direction perpendicular to the guiding direction so that said second core is bent and at least part of said second core is arranged directly above said waveguiding part of said first core.

9. An optical waveguide according to claim 6, wherein said first core and said second core have respective different refractive indexes.

10. An optical waveguide according to claim 6, further comprising an electronic circuit disposed at a portion of said cladding, said portion being thinner than the remaining portion of said cladding.

11. A multi-layer optical waveguide formed on a substrate comprising:
   a first core including
      a waveguiding part for guiding light and
      a non-waveguiding part for guiding no light;
   a cladding burying said waveguiding part and grooves defined by said waveguiding part and said non-waveguiding part and formed so as to have varying widths in a guiding directions, the cladding formed on said waveguiding part having a varying thickness in the guiding direction corresponding to the widths of the grooves and having a thinner part of which thickness is thinner than the other part;

a second core, formed on said cladding, comprising a waveguiding part guiding light, the waveguiding part of said second core including a portion thereof angled in a direction relative to the substrate corresponding to the thickness of the cladding formed on said waveguiding part of said first core, to thereby change a position of said waveguiding part of the second core in a layering direction; and a connecting section, disposed at said thinner part at which said waveguiding part of said second core comes closer to said waveguiding part said first core, for connecting said waveguiding part of said first core and said waveguiding part of said second core.

12. An optical waveguide according to claim 11, wherein said connecting section is a part of said second core.

13. An optical waveguide according to claim 11, wherein said connecting section is formed by doping said thinner part of said cladding between said waveguiding part of said first core and said second core.

14. An optical waveguide according to claim 11, wherein said first core and said second core have respective different refractive indexes.

15. An optical waveguide according to claim 11, further comprising an electronic circuit disposed at said thinner part.

* * * * *

UNITED STATES PATENT AND TRADEMARK OFFICE
CERTIFICATE OF CORRECTION

PATENT NO. : 7,103,252 B2
APPLICATION NO. : 10/103752
DATED : September 5, 2006
INVENTOR(S) : Satoshi Ide It is certified that error appears in the above-identified patent and that said Letters Patent is hereby corrected as shown below:

Title Page, Column 2 (Abstract), Line 13, change "fist" to --first--.

Column 20, Line 31, after "cladding" delete ";".

Column 20, Line 66, change "directions," to --direction,--.

Signed and Sealed this

Sixteenth Day of January, 2007

JON W. DUDAS
*Director of the United States Patent and Trademark Office*